United States Patent
Clift et al.

(10) Patent No.: US 7,126,470 B2
(45) Date of Patent: Oct. 24, 2006

(54) WIRELESS AD-HOC RFID TRACKING SYSTEM

(75) Inventors: Jeffrey C. Clift, Melbourne, FL (US); Vincent J. Kovarik, Jr., Melbourne, FL (US); Gavin C. Ridge, Vero Beach, FL (US)

(73) Assignee: Harris Corporation, Melbourne, FL (US)

( * ) Notice: Subject to any disclaimer, the term of this patent is extended or adjusted under 35 U.S.C. 154(b) by 22 days.

(21) Appl. No.: 10/814,032

(22) Filed: Mar. 31, 2004

(65) Prior Publication Data

US 2005/0225444 A1   Oct. 13, 2005

(51) Int. Cl.
*H04Q 7/00* (2006.01)

(52) U.S. Cl. ............... 340/539.13; 340/10.1; 340/5.2; 340/539.23

(58) Field of Classification Search ...............
340/539.1–539.32, 539.23, 568.1, 541, 825.49, 340/10; 235/375–385; 700/213–229; 705/28.29; 370/254–255; 709/220–222
See application file for complete search history.

(56) References Cited

U.S. PATENT DOCUMENTS

| | | | |
|---|---|---|---|
| 6,014,628 A | 1/2000 | Kovarik, Jr. | |
| 6,229,445 B1 | 5/2001 | Wack | |
| 6,246,882 B1 | 6/2001 | Lachance | |
| 6,476,718 B1 | 11/2002 | Cartwright et al. | |
| 6,509,829 B1 | 1/2003 | Tuttle | |
| 6,608,551 B1 | 8/2003 | Anderson et al. | |
| 6,690,673 B1* | 2/2004 | Jarvis | 370/401 |
| 6,693,539 B1* | 2/2004 | Bowers et al. | 340/572.1 |
| 2002/0119770 A1* | 8/2002 | Twitchell, Jr. | 455/422 |
| 2003/0144011 A1* | 7/2003 | Richards et al. | 455/456 |
| 2004/0061605 A1* | 4/2004 | Howard | 340/539.11 |
| 2004/0124982 A1* | 7/2004 | Kovach | 340/572.1 |
| 2004/0150528 A1* | 8/2004 | Natividade et al. | 340/573.3 |
| 2004/0169589 A1* | 9/2004 | Lea et al. | 340/825.49 |
| 2004/0263319 A1* | 12/2004 | Huomo | 340/10.2 |
| 2004/0268132 A1* | 12/2004 | Waris | 713/185 |
| 2005/0062603 A1* | 3/2005 | Fuerst et al. | 340/539.12 |
| 2005/0068169 A1* | 3/2005 | Copley et al. | 340/539.13 |
| 2005/0087596 A1* | 4/2005 | Larson et al. | 235/382 |

* cited by examiner

*Primary Examiner*—Jeffery Hofsass
*Assistant Examiner*—Hoi C. Lau
(74) *Attorney, Agent, or Firm*—Robert J. Sacco; Sacco & Associates, PA

(57) ABSTRACT

A method of tracking an entity (130) through a plurality of tracking stations (205, 210, 215, 220) in a wireless ad-hoc network. A unique identifier (250) can be assigned to the entity at a first (205) of the plurality of tracking stations and wirelessly transmitted to at least a second tracking station (210). The number of the tracking stations can be dynamically varied on an ad-hoc basis responsive to variations in a tracking environment. The unique identifier can be selectively communicated to at least a second tracking station based on a predicted transit scenario of the entity. The identifier can be stored on a datastore, such as a radio frequency identification tag (125) attached to the entity. A biometric scan of the entity can be performed. For example, a facial scan, an iris scan, a fingerprinting, or palm printing can be performed to assign a unique identifier.

14 Claims, 3 Drawing Sheets

WIRELESS AD-HOC RFID TRACKING SYSTEM

BACKGROUND OF THE INVENTION

1. Statement of the Technical Field

The inventive arrangements relate generally to methods and apparatus for tracking people and objects.

2. Description of the Related Art

Tracking of people and objects continues to become increasingly important in modern times, in large part due to increased levels of security that are often required to protect against terrorism and corporate espionage. In response, tracking systems have been developed for tracking people and objects, although many of these systems are very costly to implement, maintain and operate.

To address concerns about operational costs, passive electronic product code (EPC) radio frequency identification (RFID) tags have been developed. In contrast to conventional RFID tags which actively transmit identification data, the passive RFID tags do not require an independent power source, but instead operate using power received from compatible RFID scanners. Accordingly, systems using the passive EPC RFID tags are less expensive to operate as compared to other types of RFID systems. However, the range at which the passive RFID tags can be scanned is much smaller than the scanning range of active RFID tags. Thus, when passive RFID tags are used, RFID scanners must be deployed in a manner that compensates for the reduced scanning range.

Notwithstanding the operational cost savings that can be realized using passive RFID tags, the implementation and maintenance costs of such systems still make the technology cost prohibitive for use in many venues, for example for use in commercial travel centers. In particular, cable installation and the installation of specialized RFID system components are expensive.

Further, it is also very expensive to re-wire facilities and move the specialized RFID system components when building modifications are made or operational requirements change. Moreover, the time necessary to re-wire the facilities and move the system components also is unacceptable in many instances. This is especially significant when threats are constantly changing and rapid deployment and configuration is critical to the overall effectiveness of the system.

Reliability is yet another issue of concern with existing RFID tracking systems. Such systems typically utilize a central server or controller based architecture. If the central server or controller fails or goes off-line, the entire RFID tracking system becomes inoperable; this is unacceptable in certain venues. To reduce the risk of a server or controller going off-line, such system components are usually located in an area having special security provisions, again increasing the cost associated with using such systems.

A small number of patents have issued in recent years which are useful for understanding the prior art. For example, U.S. Pat. No. 6,608,551 to Anderson, et al. ("Anderson") discloses a system for tracking RFID devices using RFID tags in lieu of special purpose radios. The system uses active tags that radiate energy to a series of interrogators connected to a computer. The computer processes data from the interrogators and determines the location of the RFID tag within its cellular array of readers. Anderson relies on the user of active RFID tags.

U.S. Pat. No. 6,246,882 to Lachance ("Lachance") discloses a system using a cellular network to provide a network for communicating RFID information to a central database. The location of the cells is known and can be correlated to a geographic area.

U.S. Pat. No. 6,509,829 to Tuttle ("Tuttle") discloses a system for locating an individual in a facility. The system uses a portable wireless transponder device borne by the individual; an interrogator; and a plurality of antennas distributed in the facility. The interrogator repeatedly transmits a wireless command to the portable wireless transponder device using alternating antennas. In response, the portable wireless transponder device transmits data identifying the portable wireless transponder device if it is within communications range of the antenna sending the command. The individual in the facility is therefore locatable by determining with which antenna the interrogator was able to establish communications with the portable wireless transponder device. However, Tuttle depends on a fixed network.

U.S. Pat. No. 6,014,628 to Kovarik ("Kovarik") discloses a system for tracking objects through a collection of distributed nodes that are networked together. The system addresses the underlying tracking process utilizing predictive methods based on temporal relationships integrated with a workflow representation that is encapsulated on the object being tracked. Kovarik does not, however, address RFID or any other means of externally identifying objects being tracked in a physical environment.

SUMMARY OF THE INVENTION

The present invention relates to a method of tracking an entity through a plurality of tracking stations which are operated in a wireless ad-hoc network. A unique identifier can be assigned to the entity at a first of the plurality of tracking stations and wirelessly transmitted to at least a second tracking station. The number of the tracking stations can be dynamically varied on an ad-hoc basis responsive to variations in a tracking environment.

The unique identifier can be selectively communicated to the second tracking station based on a predicted transit scenario of the entity. The identifier can be stored on a datastore, such as a radio frequency identification tag, attached to the entity. A biometric scan of the entity also can be performed. For example, a facial scan, an iris scan, a fingerprinting, or a palm printing can be performed to assign the unique identifier.

The invention further includes wirelessly transmitting the unique identifier to a logging station. Data that is relevant to at least one of the tracking stations can be propagated from the logging station to the tracking station. The data can be propagated during a system boot of the tracking station.

The tracking system can include at least two tracking stations, each of which includes a processor, a wireless network adapter capable of operating in a wireless ad-hoc network, and a radio frequency identification scanning device that can be incorporated into a single unit. The tracking stations can further include a biometric scanning device capable of uniquely identifying a person. The processor, the wireless network adapter, the radio frequency identification scanning device, and the biometric scanning device can be incorporated into a single unit. Further, the processor and wireless network adapter can be components of a personal computer or a laptop computer.

DETAILED DESCRIPTION OF THE PREFERRED EMBODIMENTS

An embodiment in accordance with the present invention relates to a method of tracking an entity, such as a person or object, through a plurality of tracking stations which are operated in a wireless ad-hoc network. The tracking system can be deployed at a commercial travel center, such as an airport or bus station. Nonetheless, the tracking system also can be deployed at a stadium, mall, industrial complex, school, building, ship, or any other area that requires enhanced security. The tracking system can include a plurality of compact tracking stations wirelessly networked and deployed among the security zones. The tracking system can be deployed such that a person is required to be authenticated at a tracking station each time the person traverses between security zones. Further, the movement of objects belonging to a person, for instance luggage, also can be tracked. Accordingly, the movement of a person and objects associated with the person can be monitored as the person and objects traverse the various security zones.

Figure 1:
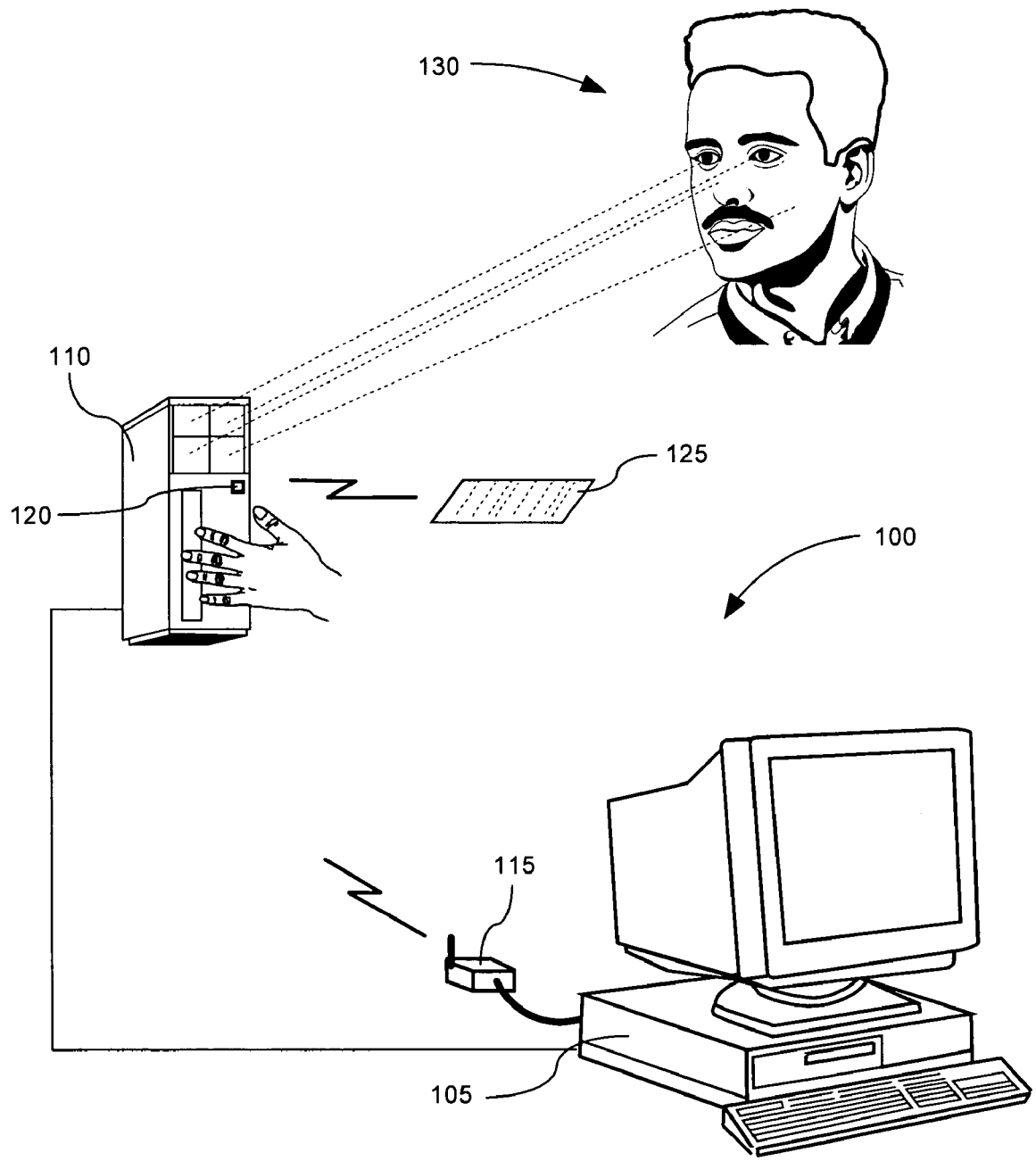
FIG. 1 is a schematic illustration showing a tracking system having a plurality of tracking stations.

Referring to FIG. 1, an exemplary tracking station 100 is shown. The tracking station 100 can include a processing device 105, a biometric scanner 110, a radio frequency identification (RFID) tag reader 120 and a network adaptor 115. The network adaptor 115 can be, for example, a wireless network adaptor. In one arrangement, the wireless network adaptor can be a multicast network adaptor that can operate in a wireless ad-hoc (spontaneous) network. An ad-hoc network is a local area network or other small network in which some of the network devices are part of the network only for the duration of a communications session or while the network devices are within a defined proximity to each other.

The RFID tag reader 120 can be configured to wirelessly sense an RFID tag 125 and provide data stored on the RFID tag 125 to the tracking station 100. For example, data from the RFID tag reader 120 can be propagated to the processing device 105. The RFID tag 125 can be either active or passive and can wirelessly propagate data associated with the person 130 or object to the RFID tag reader 120, typically in response to receiving a specific type of RF signal generated by the RFID tag reader. The RFID tag 125 can include a datastore. For instance, in one arrangement, the RFID tag 125 can comprise an electronic storage medium, such as an RFID chip. In another arrangement, the RFID tag 125 can comprise a magnetic strip. The RFID tag 125 can be assigned to an entity, such as the person 130 or the object. For instance, the RFID tag 125 can be embedded in the person's boarding pass, attached to the person's luggage, and/or attached the person's carry-on items. RFID tags and tag readers are known in the art and available from a variety of sources, for example, Matrics, Inc. of Columbia, Md.

The biometric scanner 110 can be a scanner that can perform one or more biometric scans on the person 130. For example, the biometric scanner 110 can be a scanner which performs facial scans, iris scans, fingerprinting, obtains palm prints, and/or performs any other biometric scan that can be performed on a person. Data resulting from the biometric scan can be used to generate a unique identifier that is associated with the person 130. In another arrangement, the unique identifier can be a unique pattern, a unique series of characters, such as letters, numbers or symbols, or any other unique identifier that can be generated. In yet another arrangement, a plurality of unique identifiers can be generated. In any case, one or more unique identifiers can be stored on the RFID tag 125.

The processing device 105 can be a device having a central processing unit (CPU), an application specific integrated circuit (ASIC), or any other processor suitable for processing biometric data and data relevant to tracking movement of persons and/or objects. For example, the processing device 205 can be a component of a computer, for example a personal computer such as a laptop computer. Moreover, the network adaptor 115 also can be incorporated into the computer. In another arrangement, the processing device 105, the biometric scanner 110, the network adapter 115 and/or RFID tag reader can be arranged as a single compact unit to facilitate rapid deployment of the tracking system.

Figure 2:
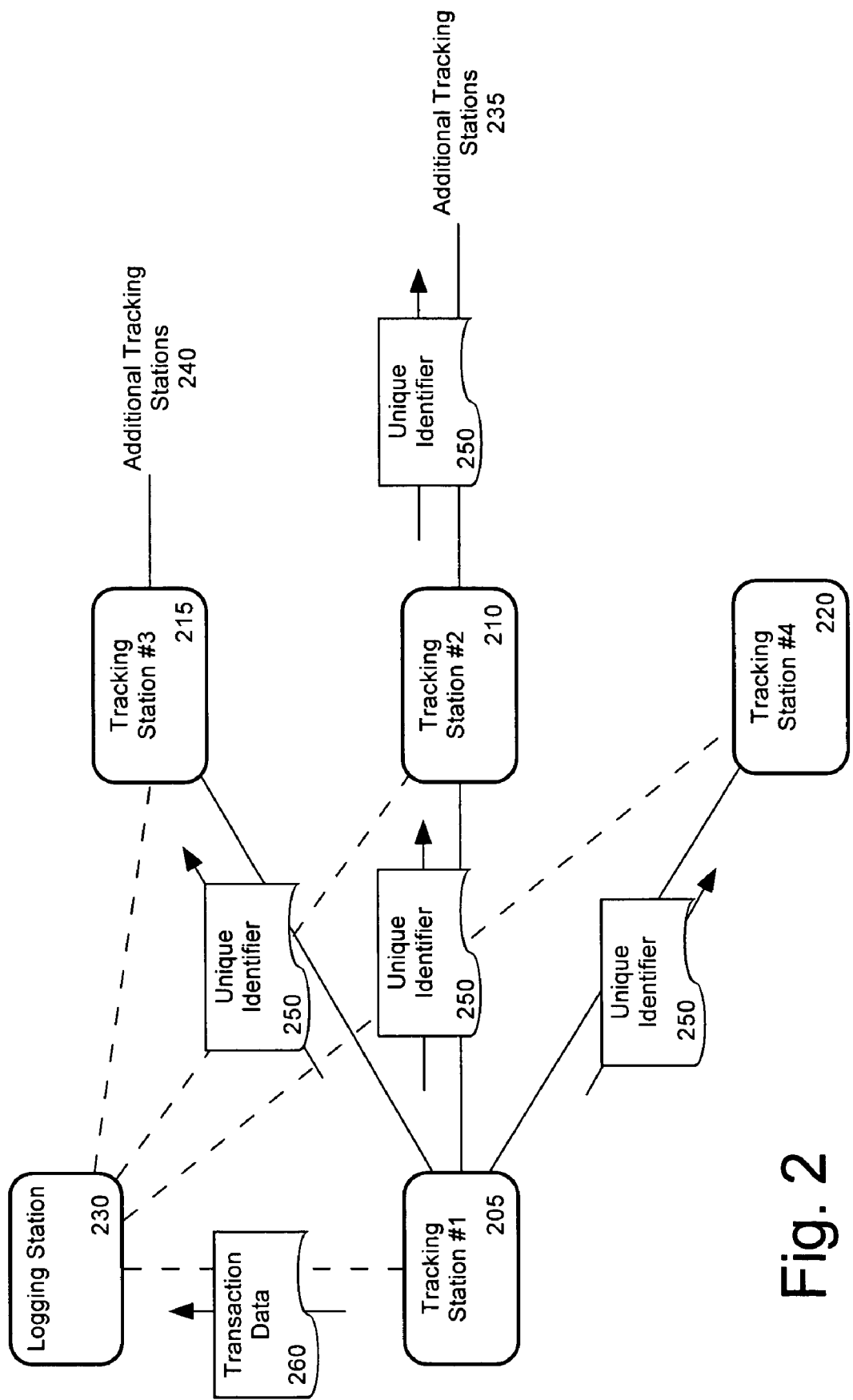
FIG. 2 is a schematic illustration showing a tracking station in FIG. 1.

Referring to FIG. 2, a plurality of tracking stations 205, 210, 215, 220 can be networked to form a tracking system 200. One or more logging stations 230 also can be provided as part of the tracking system 200. The logging station 230 can receive and store transaction data 260 transmitted from the tracking stations 205, 210, 215, 220. The transaction data 260 can include not only the unique identifier generated by the tracking station 205, but also other data generated by tracking stations. For instance, the transaction data 260 can include information relating to attempts made by respective tracking stations 210, 215, 220 to authenticate a person, information relating to attempts to authenticate objects associated with a person, an identifier for the tracking station generating the transaction data 260, an indicator of whether the object or person has cleared the tracking station, the time and date that an authentication is attempted, or any other data that can be generated by a tracking station.

The transaction data 260 can be retrieved from the logging station 230 for review and data analysis. For example, traffic patterns, wait times and alarms in a particular area can be analyzed. Still, there are a myriad of other types of data analysis that can be performed on the transaction data 260 and such data analysis is within the scope of the present invention. To access the transaction data 260, an authorized user can log into the logging station 230. In another arrangement, the transaction data can be accessed by an authorized user logging into a tracking station and establishing a communication link with the logging station 230. Nonetheless, there are numerous other methods that can be used for accessing the transaction data 260 and the invention is not limited in this regard.

The tracking stations 205, 210, 215, 220 and the logging station 230 can be wirelessly networked, for example in an ad-hoc network. Thus, tracking stations can be added or removed from the tracking system 200 as desired. For example, when a tracking station is re-booted or added to the tracking system 200, the tracking station can automatically log on and synchronize to the network, thus minimizing setup time and administration requirements. During synchronization, the tracking station can send a message to other tracking stations in the tracking system so that the other tracking stations can register the synchronizing tracking station in their respective routing tables. The synchronizing tracking station also can download from the logging station 230 all transaction data relevant to the synchronizing tracking station.

As noted, the tracking system 200 can be deployed in a secured area having a plurality of security zones, such as an airport. The first tracking station 205 can be a tracking station located at a check-in counter where people can be logged into the tracking system. At least one, and preferably two or more, uniquely identifying characteristics can be identified for a person wishing to transit through the airport. For instance, the tracking system can perform a biometric scan on the person to generate biometric data. Further, radio frequency identification (RFID) tags can be issued to the person and/or the person's objects to provide a unique RF identification associated with the person. The biometric data and/or the frequency identification can be included in a set of identifying characteristics 250 that can be used by the tracking system 200 for authentication purposes.

The identifying characteristics 250 can be wirelessly transmitted from the first tracking station 205 to other tracking stations. For example, the identifying characteristics can be transmitted to tracking stations located at concourse screening areas, concourse gates, airport exits, etc. The identification characteristics 250 can be used by any of the other tracking stations through which the person or objects associated with the person are to be authenticated. For example, a tracking station can perform a biometric scan and/or read data from an RFID tag associated with the person.

Thus, a person can be tracked and identified as he traverses through a secured area. Similarly, objects associated with the person, such as luggage, also can be tracked as they pass through the secured area. Notably, each time a person or an object associated with the person is authenticated at a tracking station, the present location of the object and the present location of the person can be compared to determine whether the object is in an appropriate security zone. For instance, if the person is authenticated at a tracking station for a first gate, but his luggage was last authenticated at a tracking station for another gate, an event notification can be generated. The event notification can be sent to security personnel and/or system administrators.

In many instances a person cannot proceed directly from a check-in counter to a concourse gate without first passing through a concourse screening area. In such an instance, it may not be necessary to transmit the identifying characteristics 250 directly from the check-in counter to the concourse gates. Instead, the identifying characteristics 250 can be transmitted exclusively to the logging station 230, to luggage handling tracking stations, and to tracking stations located at security zones to which the person can directly proceed without first stopping at an intervening tracking station. For example, if the second tracking station 210 is located at a concourse "A" screening area, the third tracking station 215 located at a concourse "B" screening area, and the fourth tracking station 220 is located at an exit, and there are no other exits or security zones to which the person can directly proceed, the identifying characteristics 250 can be forwarded exclusively to the tracking stations 210, 215, 220, the luggage handling tracking stations, and the logging station 230.

There are many techniques known to the skilled artisan that can be used to direct data to a specified tracking station. For example, address headers within data packets can contain the addresses of specified tracking stations. These capabilities are described in well-defined network communications standards that describe low-level protocols between network nodes. Such standards include those for Transmission Control Protocol/Internet Protocol (TCP/IP), Internet Protocol (IP), Simple Network Management Protocol (SNMP), Internetwork Packet eXchange (IPX), and various other communications protocols.

Once the person has been authenticated by one of the tracking stations 210, 215, 220, the identifying characteristics 250 can be forwarded to other tracking stations to which the person can directly proceed. For example, identifying characteristics 250 can be forwarded to additional tracking stations 235 at gates located within concourse "A" if the person is authenticated at the second tracking station 210. Thus, tracking stations located at gates in concourses where the person has not entered, for example additional tracking stations 240, will not be burdened with processing the person's identifying characteristic data. Thus, valuable processing and communication resources on each tracking station can be preserved for necessary activities. Moreover, the amount of network bandwidth that is utilized by the tracking system can be minimized.

In one arrangement, the tracking stations at which the person should be authenticated can be identified based on a person's predicted transit scenario, for example based on the person's travel plans. If the person then attempts to check through an incorrect tracking station, the person can be alerted that he is at the wrong location and provided with information to help him find the proper location. Moreover, security personnel can be alerted to prevent the person from entering a zone in which he is not authorized to enter.

Figure 3:
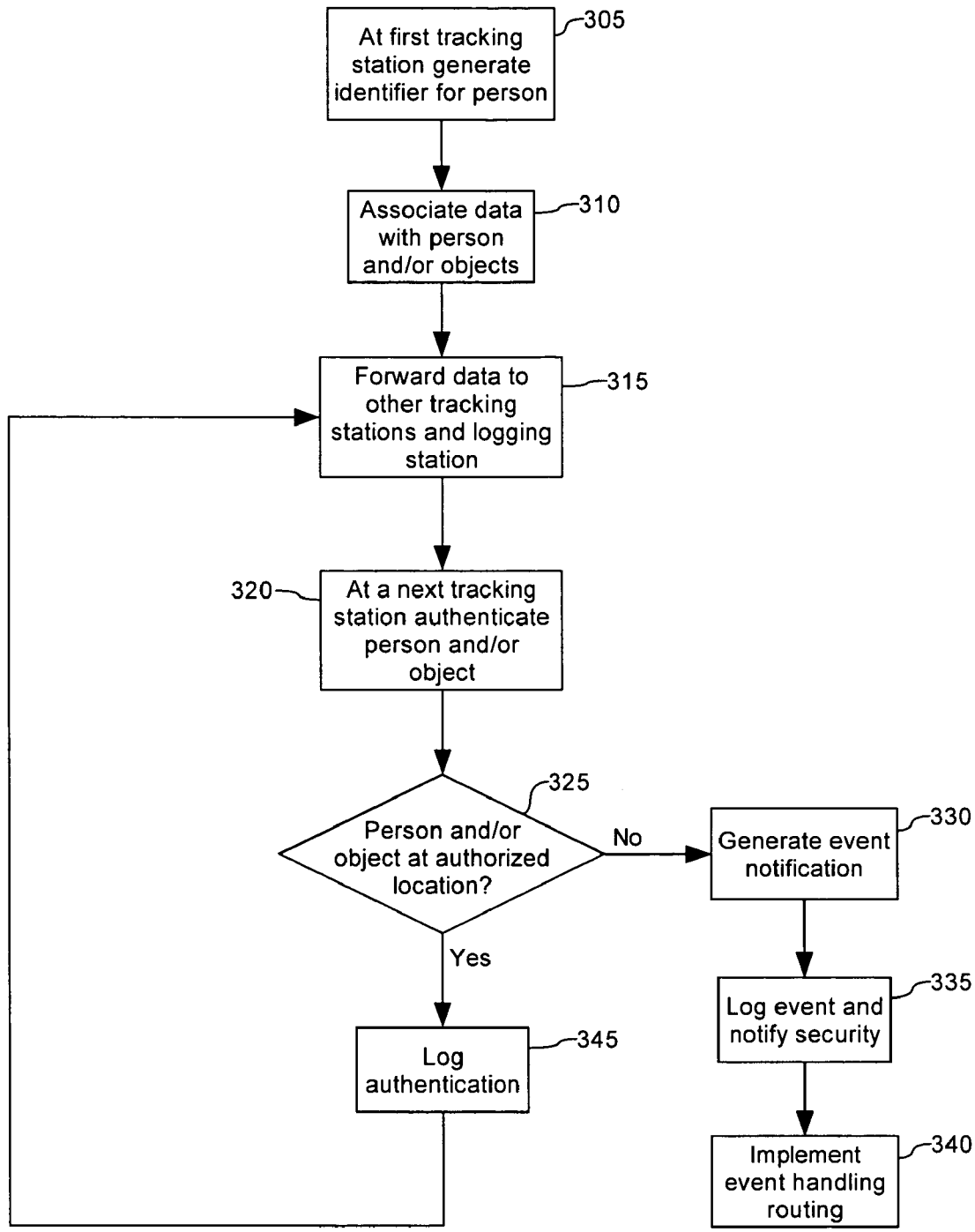
FIG. 3 is a flow chart that is useful for understanding the present invention.

Referring to FIG. 3, a flow chart is shown which is useful for understanding a process 300 for tracking a person and/or object in accordance with the present invention. Beginning at step 305, a unique identifier can be generated for a person. The unique identifier can be a unique pattern, a unique series of characters, such as letters, numbers or symbols, or any other unique identifier that can be generated. In one arrangement, the unique identifier can be based upon an identifying characteristic of the person. For example, the identifying characteristic can be measured at a first tracking station, for instance with a biometric scanner. The unique identifier can be associated with the person and objects associated with the person, for example luggage, as shown in step 310. Further, a unique RFID tag can be assigned to the person and each object associated with the person. For instance, RFID tags can be embedded in a boarding pass and/or luggage tags. Notably, the RFID tags can store a unique identification correlating to the person.

Proceeding to step 315, the unique identifier can be forwarded to a logging station and other tracking stations, for example those tracking stations to which the person may directly proceed, or where the objects associated with the person may be sent (either intentionally or not). The person and/or objects associated with the person then can be authenticated at a second tracking station which has received the unique identifier, as shown in step 320. For example, an RFID tag carried by the person can be scanned by an RFID reader and/or a biometric scan can be performed on the person.

Referring to decision box 325, if the person or objects are not at a correct location, for example the person is exiting a secured airport but has left an object within a concourse, then an event notification can be generated, as shown in step 330. An event notification also can be generated if a person attempts to check through a tracking station which has not received the identifying characteristics data, or the person attempts to check through a tracking station in a security zone for which the person has not been granted access. Similarly, if the objects associated with the person are scanned by a tracking station located in an incorrect security zone or not having the identifying characteristics data, an event notification can be generated, as shown in step 330. Continuing at step 335, the event notification can be forwarded to the logging station and the event can be logged. Further, additional event handling routines can be implemented, as shown in step 340. For example, certain event notifications can trigger security alarms and alert security personnel. The event notifications also can alert other personnel, for instance to alert baggage handlers that luggage is being sent to the wrong gate. Still, there are a number of other types of event handling routines that can be implemented.

If the person is authenticated at a correct tracking station, and any objects associated with the person also are authenticated at a correct tracking station, the authentication can be logged, as shown in step 345. For example, data of the transaction can be sent to the logging station. A record of the transaction also can be stored on the tracking station itself. If there are further stations that the person potentially may check through, the identifying characteristics of the person can be sent to those tracking stations, as shown in step 315.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

The invention claimed is:

1. A method of tracking an entity comprising:
   operating a plurality of tracking stations in a wireless ad-hoc network;
   assigning to the entity a unique identifier;
   determining the presence of the entity within a predetermined area at a first of the plurality of tracking stations responsive to detection of the unique identifier;
   comparing at the tracking station the unique identifier that has been detected with a database of unique identifiers stored at the tracking station;
   wirelessly transmitting the unique identifier that has been assigned to the entity to at least a second of the plurality of tracking stations; and
   dynamically varying the number of the tracking stations on an ad-hoc basis responsive to variations in a tracking environment; and
   wherein the step of wirelessly transmitting the unique identifier comprises selectively communicating the unique identifier to at least the second tracking station based on a predicted transit scenario of the entity.

2. The method of claim 1 further comprising storing the unique identifier on a datastore attached to the entity.

3. The method of claim 2 wherein said step of storing the unique identifier comprises storing the unique identifier on a radio frequency identification tag.

4. The method of claim 1, wherein the step of assigning a unique identifier comprises performing a biometric scan of the entity.

5. The method of claim 4, wherein the biometric scan comprises at least one process selected from the group consisting of a facial scan, an iris scan, a fingerprinting, and obtaining a palm print.

6. The method of claim 1, further comprising wirelessly transmitting the unique identifier to a logging station.

7. The method of claim 6, further comprising propagating from the logging station to at least one of the plurality of tracking stations data that is relevant to the at least one of the plurality of tracking stations.

8. The method of claim 7, wherein the data is propagated during a system boot of the at least one of the plurality of tracking stations.

9. A tracking system comprising:
   at least two tracking stations, each of the tracking stations comprising:
      a processor;
      a datastore containing a database of unique identifier information;
      a wireless network adapter capable of operating in a wireless ad-hoc network; and
      a radio frequency identification scanning device coupled to the processor and responsive to a RFID tag for determining the presence of said RFID tag within a predetermined area;
      wherein the processor compares a unique identifier associated with the RFID tag with a database of unique identifiers stored at the tracking station;
      wherein the wireless network adaptor wirelessly transmits the unique identifier to at least a second one of the tracking stations; and
   wherein the processor determines a predicted transit scenario for an entity possessing the unique identifier and selectively identifies at least the second one of the tracking stations to which the unique identifier is transmitted based on the predicted transit scenario.

10. The tracking system of claim 9, wherein the processor, the wireless network adapter and the radio frequency identification scanning device are incorporated into a single unit.

11. The tracking system of claim 10, wherein each of the tracking stations further comprises a biometric scanning device capable of uniquely identifying a person.

12. The tracking system of claim 11, wherein the processor, the wireless network adapter, the radio frequency identification scanning device and the biometric scanning device are incorporated into a single unit.

13. The tracking system of claim 9, wherein the processor and wireless network adapter are components of a personal computer.

14. The tracking system of claim 9, wherein the processor and wireless network adapter are components of a laptop computer.

* * * * *